United States Patent
Eilers

(10) Patent No.: US 6,766,879 B2
(45) Date of Patent: Jul. 27, 2004

(54) SOUND REDUCING DEVICE FOR A COFFEE GRINDER AND OTHER KITCHEN APPLIANCES

(76) Inventor: Brett Eilers, 1652 Dolores St. #7, San Francisco, CA (US) 94110

( * ) Notice: Subject to any disclaimer, the term of this patent is extended or adjusted under 35 U.S.C. 154(b) by 0 days.

(21) Appl. No.: 10/234,822

(22) Filed: Sep. 4, 2002

(65) Prior Publication Data

US 2003/0042069 A1 Mar. 6, 2003

Related U.S. Application Data

(60) Provisional application No. 60/317,346, filed on Sep. 5, 2001.

(51) Int. Cl.$^7$ .................. G10K 11/04; A47B 81/06; H02K 5/24
(52) U.S. Cl. .................. 181/200; 181/198; 181/202
(58) Field of Search ................. 181/198, 200, 181/202, 205, 285, 201; D7/388, 399, 368, 668, 372, 373, 374, 378; 241/100, 301; 381/71.3

(56) References Cited

U.S. PATENT DOCUMENTS

| | | | | |
|---|---|---|---|---|
| 4,258,821 A | * | 3/1981 | Wendt et al. ............... | 181/202 |
| 5,211,471 A | * | 5/1993 | Rohrs ........................ | 362/206 |
| 5,533,797 A | * | 7/1996 | Gelber ..................... | 312/138.1 |
| 5,957,577 A | * | 9/1999 | Dickson et al. ............. | 366/197 |
| 5,965,851 A | * | 10/1999 | Herreman et al. .......... | 181/200 |
| 6,357,342 B1 | * | 3/2002 | Leung ........................ | 99/279 |
| 6,571,908 B2 | * | 6/2003 | Bohannon et al. .......... | 181/198 |
| 2002/0047061 A1 | * | 4/2002 | Wulfman et al. ........... | 241/100 |

FOREIGN PATENT DOCUMENTS

| | | | | |
|---|---|---|---|---|
| DE | 1039759 | * | 9/1958 | |
| GB | 1302641 | * | 6/1971 | |
| JP | 59-220909 A | * | 12/1984 | ........... H01F/27/33 |

* cited by examiner

Primary Examiner—Robert Nappi
Assistant Examiner—Patrick Miller
(74) Attorney, Agent, or Firm—Fliesler Meyer LLP

(57) ABSTRACT

A device and a method for reducing or muffling sound from kitchen appliances such as coffee grinders. The sound reducing or muffling device can be left on the appliance even when not in use, providing a decoration to the kitchen in a style appropriate to it's surroundings. Using the muffling device, a person can enjoy fresh-ground coffee at any time with the assurance that the sound from the coffee grinder is well insulated. The device is particularly easy to deploy and use, requires no moving parts, and is flexible enough to work with the majority of coffee grinder products currently on the market. Other embodiments can be used with other forms of kitchen appliances.

10 Claims, 7 Drawing Sheets

SOUND REDUCING DEVICE FOR A COFFEE GRINDER AND OTHER KITCHEN APPLIANCES

CLAIM OF PRIORITY

This application claims priority from provisional application "SOUND REDUCING DEVICE FOR A COFFEE GRINDER AND OTHER KITCHEN APPLIANCES" Application No. 60/317,346 filed Sep. 5, 2001, and which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates generally to kitchen appliance covers, and particularly to a device for reducing or muffling sound from appliances such as coffee grinders during operation of the appliance.

BACKGROUND OF THE INVENTION

Many people like to start their morning with a fresh cup of coffee, a practice that is widespread throughout the world, and particularly throughout Europe and America. The United States is the largest individual coffee-consuming nation in the world, drinking approximately one fifth of the 14 billion total pounds of coffee grown worldwide, which translates to an average of 500 million cups of coffee every single day. Every year in the United States more than $5 billion of roasted coffee is sold nationally, making coffee the second most valuable item of international trade after petroleum.

The American National Coffee Association recommends that coffee consumers purchase their coffee as soon after it has been roasted as possible, since fresh roasted coffee produces a better cup of coffee, and that they purchase coffee in small amounts—only as much as can be used in a given period of time. When whole bean coffee is used it should be ground as close to the brew time as possible for best results. Increasingly nowadays, more and more people are following these recommendations, as coffee has become an important component of their diet and social life. In recent years specialty coffees have become more important with better beans and darker roasts, and these premium coffees now account for 20% of the roasted coffee sold in the United States.

It is apparent from these statistics and recommendations that to brew the best coffee, and particularly to get the most out of what can be an expensive investment in specialty coffee, that one should buy whole bean coffee and grind that coffee just prior to brewing. Only then can the maximum benefit be obtained. This simple fact has generated huge sales in home coffee grinders over recent years, most of which are unfortunately quite noisy in use. Noisy coffee grinders may seem like a small inconvenience, but given that so many people enjoy their coffee early in the morning, often when others in the household are fast asleep, there exists a huge problem—how to grind and brew the best coffee without waking everyone else up? In general, coffee consumers would like to enjoy the best, freshest ground coffee, and maximize their investment in premium coffee beans, without causing an annoyance to others with the noise of their coffee grinder.

SUMMARY OF THE INVENTION

The invention addresses the needs of those people who prefer to grind their own coffee, and particularly those early morning risers or others who are inconvenienced by the sound of their coffee grinder. Generally, the invention relates to kitchen appliances and covers, and specifically in one embodiment to a device for reducing or muffling the sound from kitchen appliances such as coffee grinders. Additionally, the muffling device can be left on the appliance even when not in use, providing a much welcome decoration to the kitchen in a style appropriate to it's surroundings. Using the muffling device, a person can enjoy fresh-ground coffee at any time of the day with the assurance that the sound from the coffee grinder is well insulated (i.e. reduced). The invention is particularly easy to deploy and to use, requires no moving parts, and is flexible enough to work with the majority of coffee grinder products currently on the market. Other embodiments can be fashioned within the spirit and scope of the invention so as to work with other, non-standard coffee grinders or kitchen appliances.

In one embodiment the invention comprises a sound reducing or muffling device for a coffee grinder, comprising: a housing having a substantially cylindrical shape, said housing including an open end, and a roof end; a sound reducing material within said housing; and, wherein said housing may be placed on a coffee grinder, and pressure applied to said roof end to activate said coffee grinder with the sound reduced.

DETAILED DESCRIPTION

The United States is the largest individual coffee-consuming nation in the world, with the national population as a whole drinking an average of 500 million cups of coffee every single day. Research has shown that coffee consumers are increasingly preferring the freshly ground variety. Given that so many people enjoy their coffee early in the morning, often when others in the household are fast asleep, there exists a considerable problem in how to allow them to grind and brew the best coffee without waking up everyone else. An embodiment of the invention addresses the needs of all coffee drinkers and particularly those early morning coffee drinkers who prefer to grind their own coffee, in providing a device for reducing or muffling sound from coffee grinders and other kitchen appliances. The muffling device is particularly easy to deploy and use, requires no moving parts, is flexible enough to work with the majority of coffee grinder products currently on the market, and can be left on the appliance even when not in use, providing a much welcome decoration to the kitchen in a style appropriate to it's surroundings.

Figure 1:
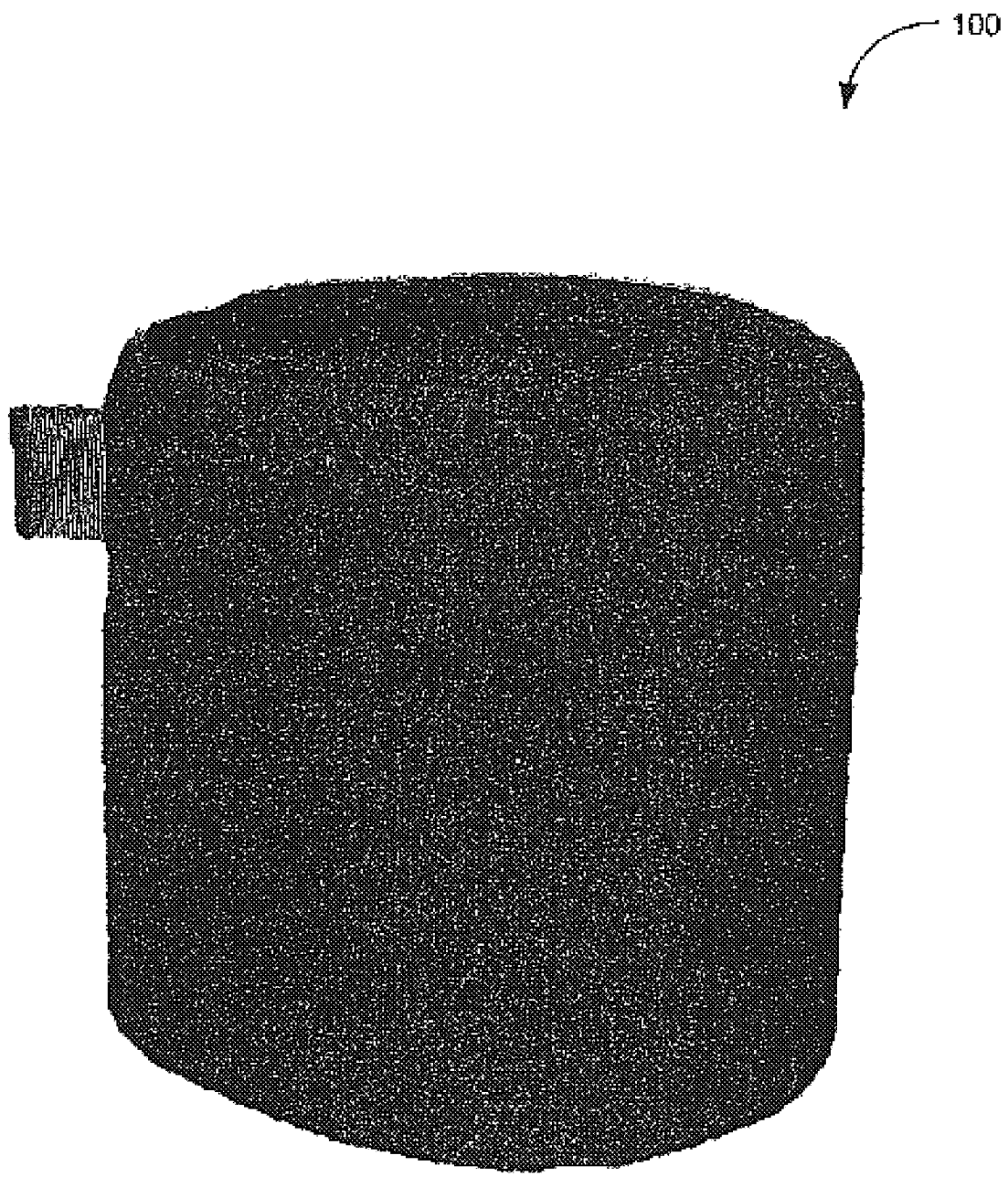
FIG. 1 shows an illustration of a sound muffling device in accordance with an embodiment of the invention.

FIG. 1 shows a particular design of such a muffling device referred to in one embodiment as a "gruffler", adapted for use with a coffee grinder.

Figure 2:
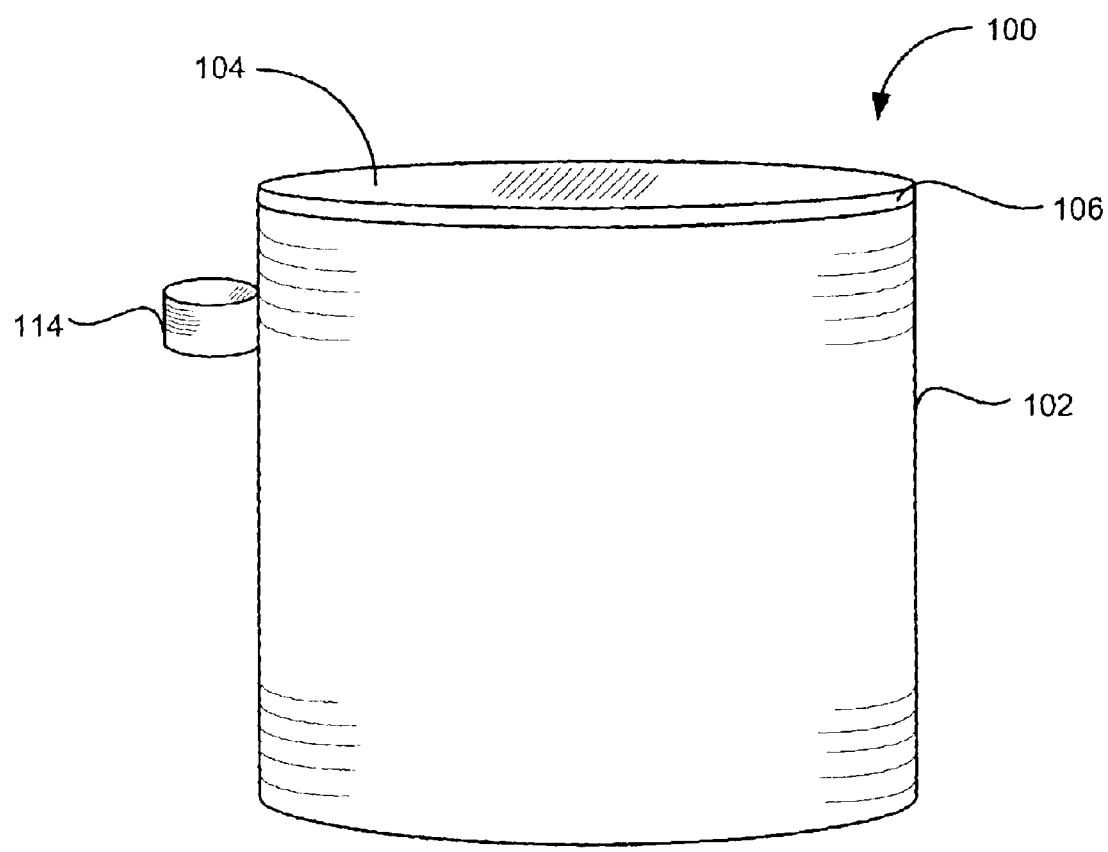
FIG. 2 shows another illustration of a sound muffling device in accordance with an embodiment of the invention.
Figure 3:
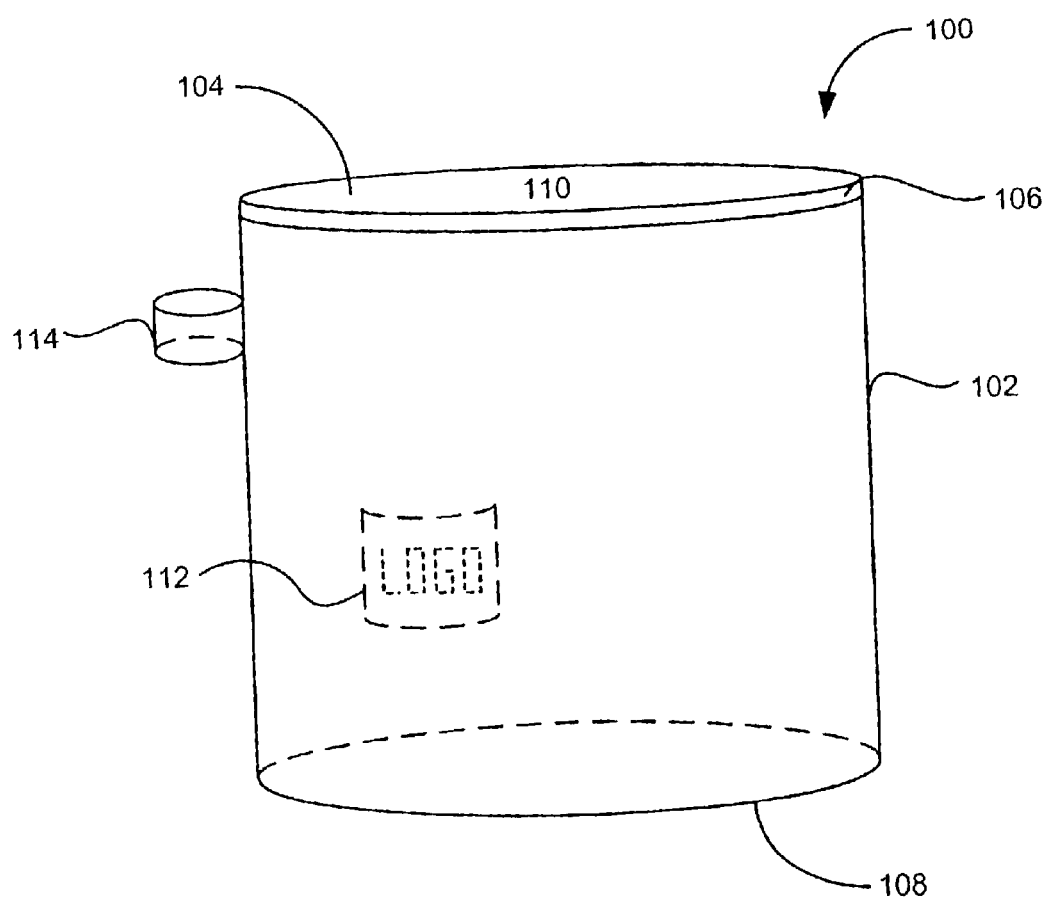
FIG. 3 shows another illustration of a sound muffling device in accordance with an embodiment of the invention.

FIGS. 2 and 3 show a more detailed illustration of a sound reducing or muffling device 100 of FIG. 1 in accordance with an embodiment of the invention.

As shown in FIG. 2 the muffling device 100 comprises a substantially cylindrical shaped structure 102 that functions as a housing or enclosure. Although in this example the housing 102 is shown as having an oval cross-section to reflect (and conform to) one of the more common designs of coffee grinders on the market, it will be evident to one of skill in the art that other cross sectional areas may be equally used including square, circular, or irregular cross sections. The housing can be made of a flexible material that conforms to the shape of the coffee grinder, so that an exact shape, size or fit is not essential. The curved sidewalls of the housing define a first end of the cylindrical structure 102 includes an opening 108 to allow the device to be placed over, or to receive, a kitchen appliance such as a coffee grinder. At a second, peripheral or top end of the cylindrical housing 102, a roof 104 is attached or bonded to the housing along the sidewall edge 106, giving the entire apparatus the appearance of a cylinder with an open end and a closed end. The typical dimensional for the housing 102 shown are a height of six inches and an external width of five inches, although it will be evident that any size or dimension may be used to accommodate the variety of coffee grinders on the market.

The housing 102 and the roof 104 may be fabricated of many types of materials including, for example, a nylon back-pack type material, fabric or cloth, plastic, or any other equivalent material. The characteristics of the material used should be that it is flexible enough to accommodate a variety of kitchen appliances or coffee grinders, and also that it can withstand the normal wear and tear commonly found in kitchens and in the work place. An additional benefit of using a nylon, cloth-like or plastic material to cover the device is that the exterior of the housing may be tailored or patterned to suit the particular kitchen, work place, or any other location in which the device is to be situated. In some embodiments multiple colors and designs can be used to allow the owner or purchaser of the product to customize the appearance of their muffling device to best suit their surroundings. Alternative embodiments of the invention may use a housing made of a hard or inflexible material such as metal, chrome, or hardened plastic. In these embodiments the housing can be made wide enough to accommodate a wide variety of coffee grinders without the need for flexibility in the housing itself, or an internal flexible liner can provide the necessary flexibility and conformance.

Typically, the roof 104 is made of the same material as the cylindrical housing itself. If the materials used for the housing are cloth or nylon back-pack material, then the binding 106 can be a simple stitching bond. If plastic materials are used for both the housing and the roof then a glue or a heat bind element can be used instead. It will be evident to one skilled in the art that although specific design elements are disclosed here for the purpose of illustration, the invention is not limited to using these specific materials and that other materials may be used both for the cylindrical housing element and the roof while remaining in the spirit and scope of the invention.

Additional embodiments of the invention may include locations for logo placement at, for example, areas 110 and 112, or any other suitable area on the surface of the housing. In this manner, the muffling device can be customized with marketing materials such as, for example, the name of the particular manufacturer of coffee grinder, or perhaps a coffee vendor. A loop element 114 can in some embodiments be included to allow the attachment of labels and price tags. The loop element 114 may be made of a cloth material or paper material that also allows manufacturing information, such as origin of manufacture to be attached to the device.

Figure 4:
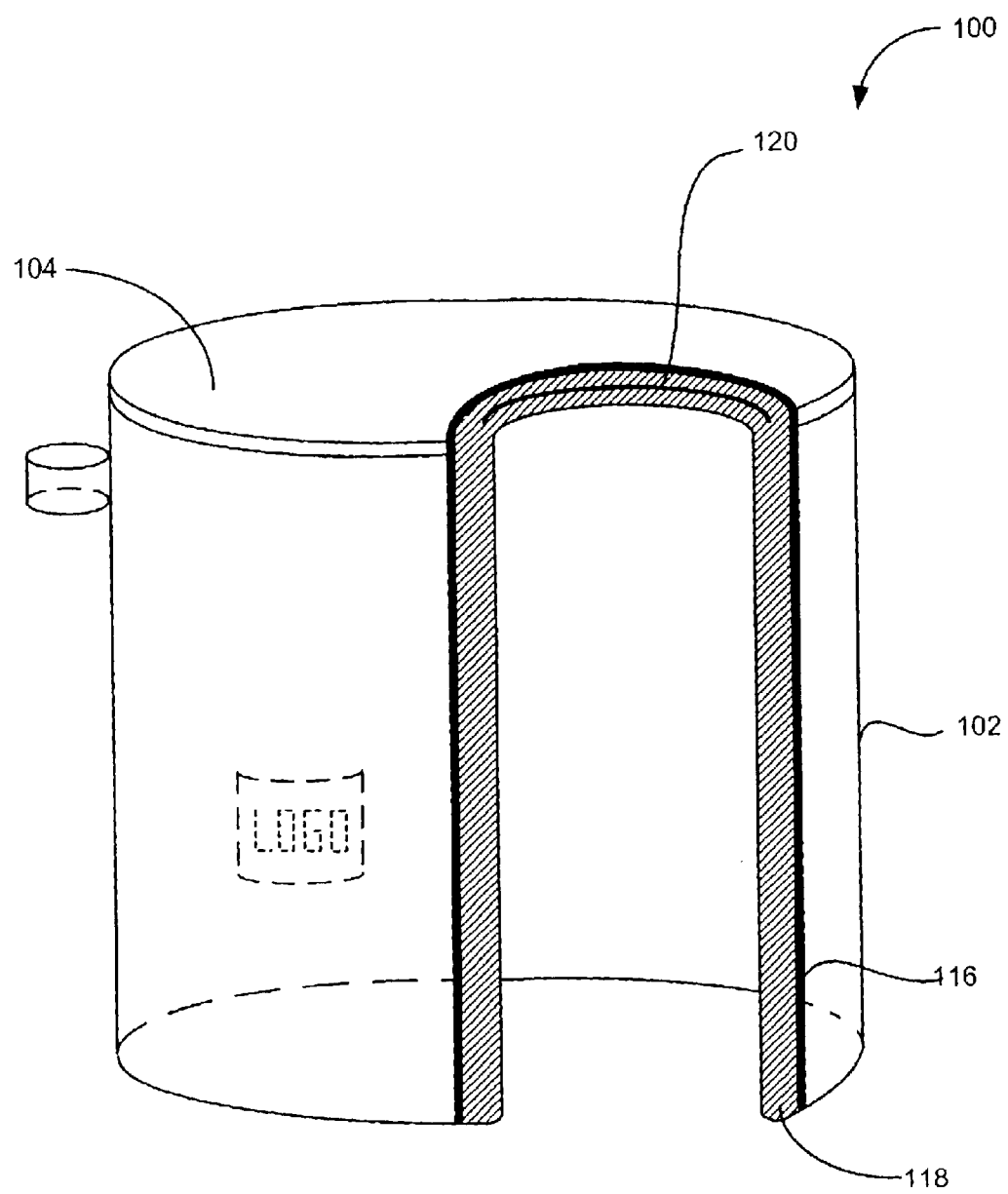
FIG. 4 shows a cutaway illustration of the sound muffling device of FIG. 1.

FIG. 4 shows a cutaway illustration of the sound reducing device of FIG. 2 that shows the internal structure within one embodiment of the device. As shown in FIG. 4, the housing may comprise additional layers, including, for example, an outer covering layer 116 made of a cloth-like or plastic material, and an acoustic layer 118 which serves the purpose of reducing or muffling the sound from the kitchen appliance or coffee grinder. It will evident to one of skill in the art that the layers shown are those needed to practice one embodiment of the invention. In other embodiments other layers may be added or may replace those shown, including, for example, custom cover layers or custom fit layers, while remaining within the spirit and scope of the invention.

Within the roof 104 a stiffening element 120 is used both to provide rigidity to the roof and to assist in using the device with a coffee grinder, the process of which is described in further detail below. The stiffening element has a shape roughly equivalent to that of the roof itself and may be either substantially flat or domed. Additionally, the stiffening element may be bonded to the roof or may instead be enclosed but freely moving within a roof layer.

The acoustic layer can be, for example, a perforated acoustic foam interior or an equivalent sound muffling material known to one of skill in the art. Such materials commonly in use include Audioseal, and Auralex, although equivalents may be used. The acoustic layer is designed to muffle sounds emanating from the kitchen appliance. Tests with the invention have shown that sounds from appliances such as coffee grinders can be substantially reduced by using the muffling device.

Figure 5:
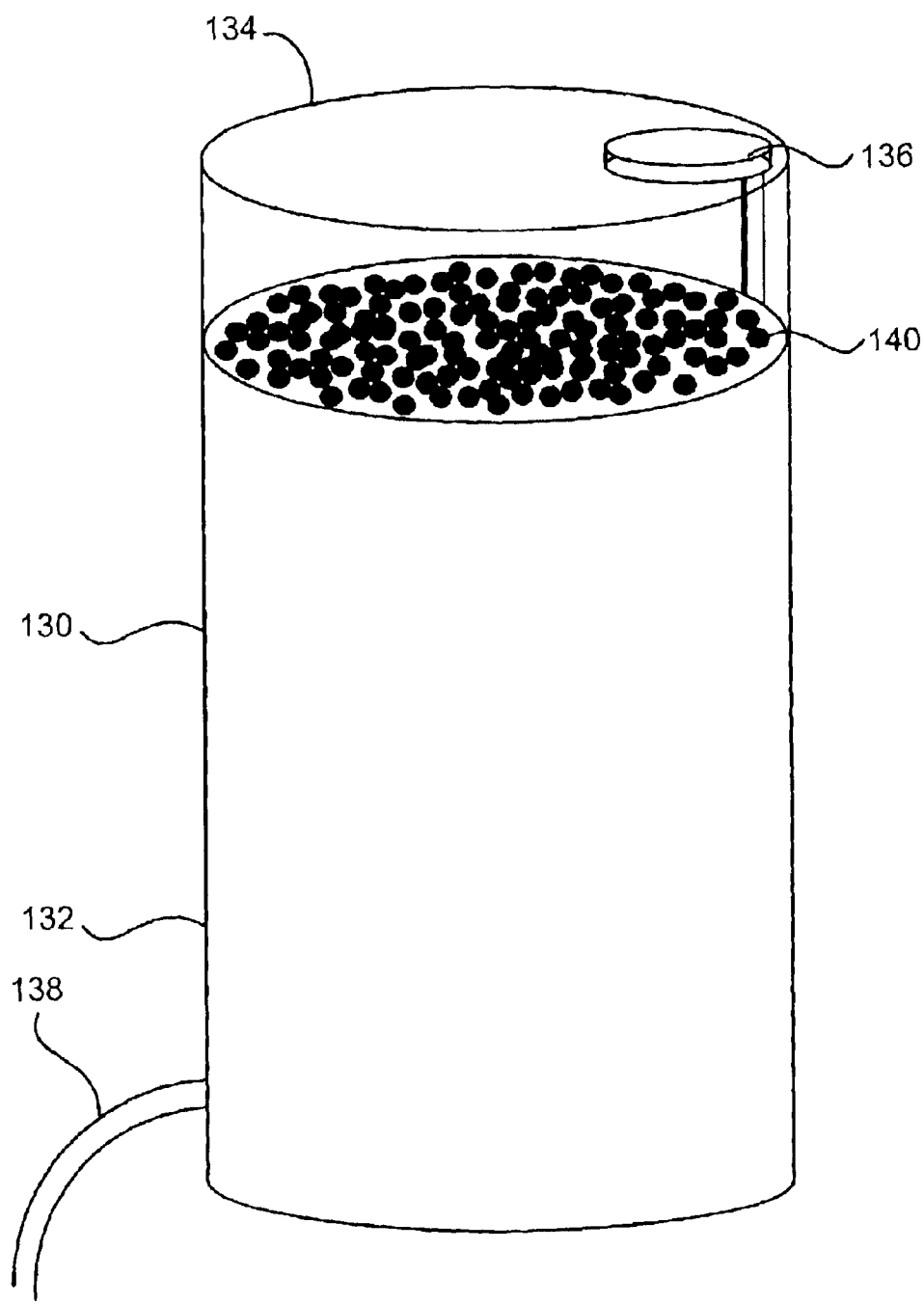
FIG. 5 shows an illustration of a coffee grinder for use with an embodiment of the invention.
Figure 6:
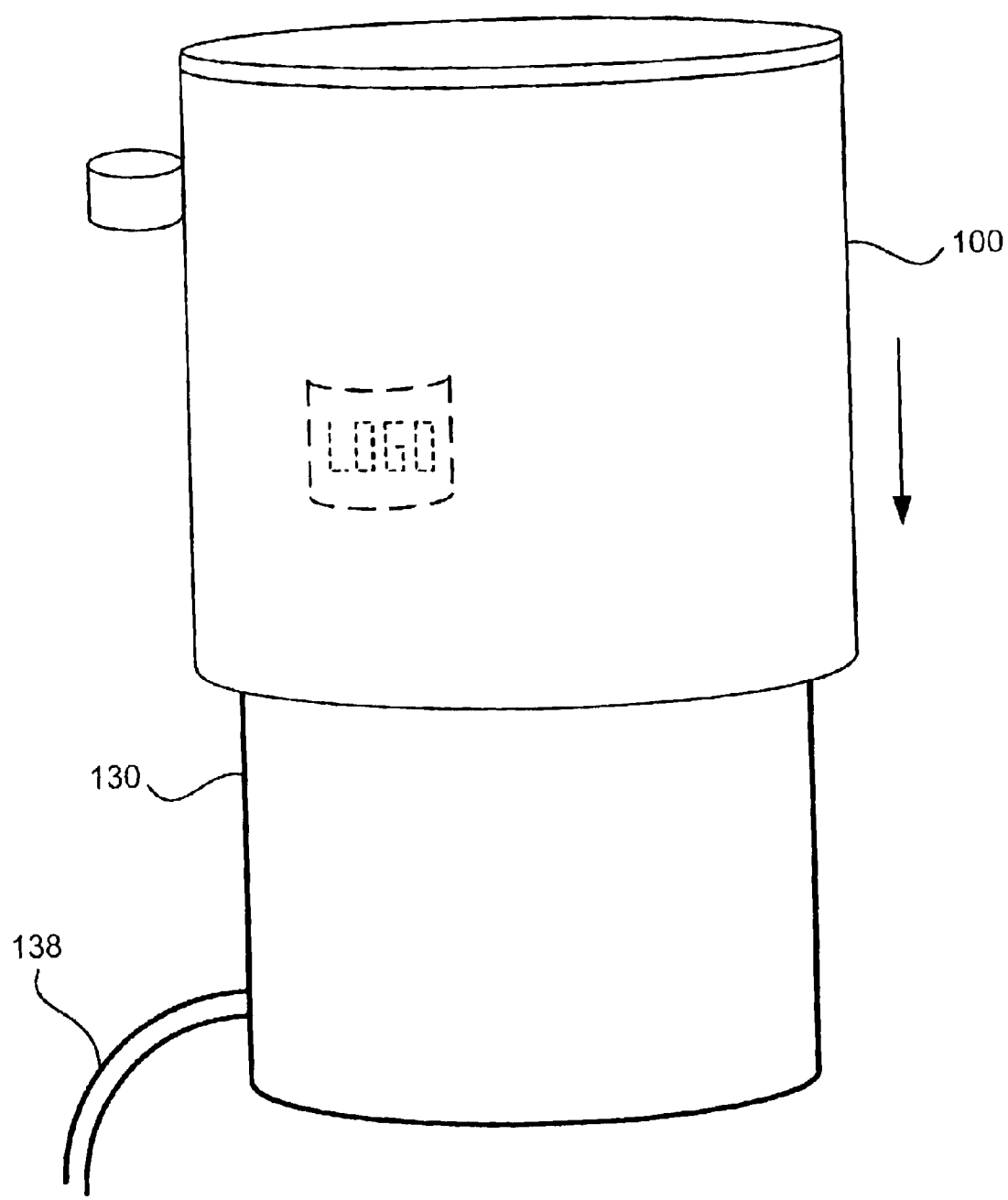
FIG. 6 shows an illustration of a coffee grinder with a muffling device in accordance with an embodiment of the invention deployed therewith.
Figure 7:
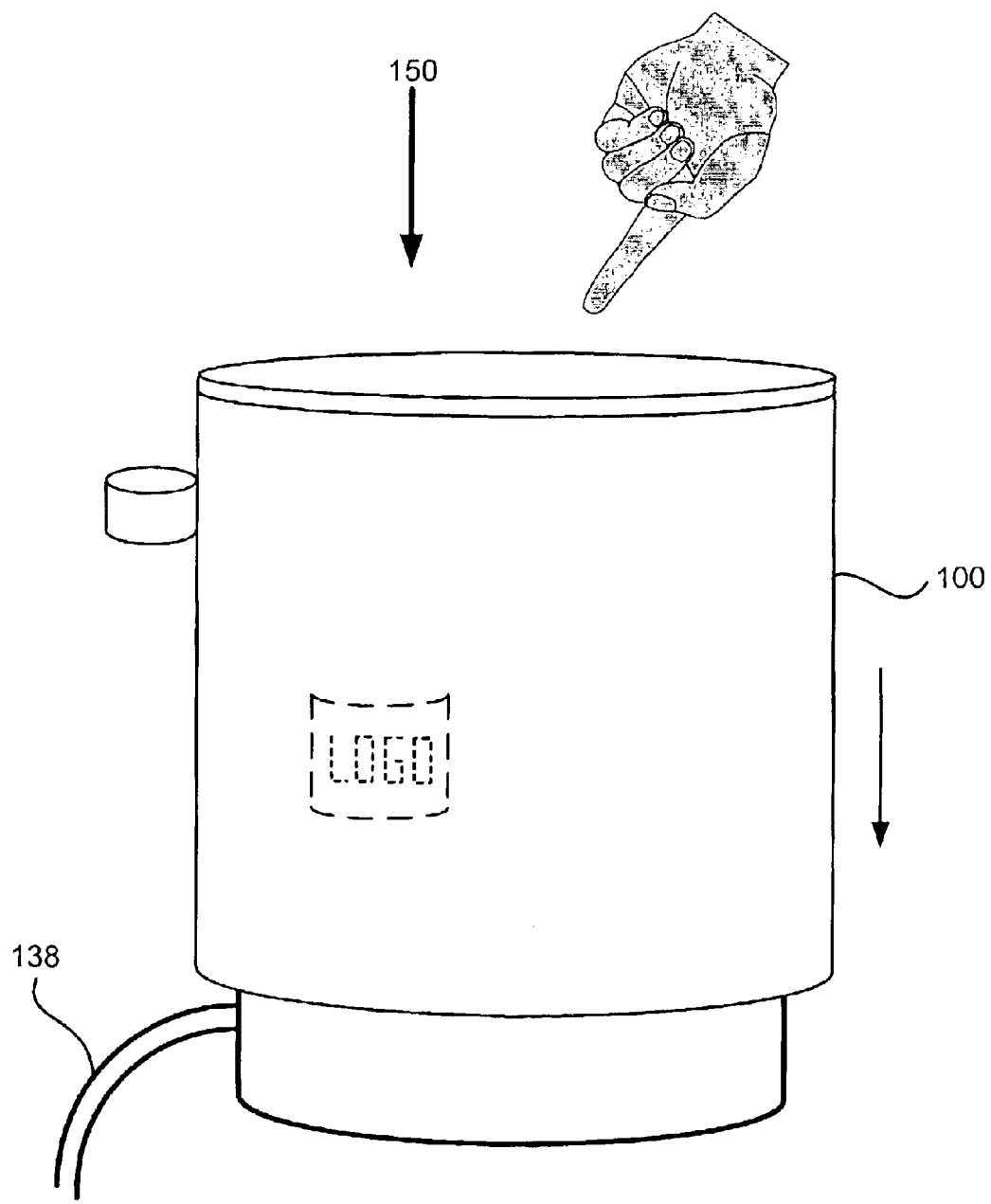
FIG. 7 shows an illustration of a coffee grinder being used with a muffling device in accordance with an embodiment of the invention.

FIGS. 5 through 7 show an illustration of a sound muffling device in accordance with an embodiment of the invention being deployed with a typical coffee grinder, and the coffee grinder being subsequently used with the sound muffling device in place.

Particularly, FIG. 5 illustrates a typical coffee grinder device that may be used with the invention. As shown in FIG. 3A the coffee grinder device 130 includes a body 132 and a lid 134. Typically the lid is fabricated from a transparent material to allow the user of the device to see the coffee as it is being ground. The lid may be removed to allow coffee beans 140 to be loaded into the device. A power cord 138 provides electrical power to the device. As shown in this example the coffee grinder also includes a power switch (on/off) mechanism 136 which allows the user to apply power to the device and to grind the coffee. Typically, although not always, the switch mechanism 136 is a simple push button device affixed or embedded within the roof or lid 134. When the switch mechanism 136 is depressed the device switches on and the coffee is ground. When the switch mechanism 136 is released, the device turns off. It is during the normal operation of the device, i.e. when the switch mechanism 136 is depressed, that the most sound or noise is generated. It is during this time that the invention provides the most benefit.

FIG. 6 illustrates the sound muffling device deployed upon the coffee grinder. As shown in FIG. 6, the sound muffling device 100 is simply placed over and upon the coffee grinder 130. Since the cylindrical device 100 may or may not totally cover the coffee grinder 130, a portion of the body of the coffee grinder may protrude from the housing. This does not impinge upon the performance of the muffling device to any considerable extent. Enough space is left beneath the bottom of the covering to allow the power cord 138 to extend from the device. Since the muffling device is made from lightweight cotton or plastic material, the weight of the device as it sits on the coffee grinder is by itself not enough to depress the power switch or to operate the device. In this manner, the muffling device may actually be left on the coffee grinder when the grinder is not in use, without activating the on/off mechanism.

FIG. 7 illustrates the actual use of the coffee grinder together with the sound muffling device. As shown in FIG. 7, the device is now fully deployed upon the coffee grinder. Additional pressure 150 may be applied to the device by the user, in a downward direction so as to depress the on/off switch and to cause the coffee grinder to activate. Since the housing 102 substantially covers the coffee grinder, the sound from the coffee grounder is muffled. In this way, a user can grind coffee at any time in the day without experiencing the typically annoying sound that accompanies such an operation, and particularly without fear of disturbing others in the household who are still asleep. To switch off the device and retrieve the coffee, the user pressure 150 is removed. This causes the on/off switch to be released and the coffee grinder to switch off. When powered off, the sound muffling device may be removed, and the coffee retrieved from the coffee grinder itself.

Although the foregoing description of the invention includes details of specific materials, shapes and colors, it will evident to one of skill in the art that alternate designs may be used while remaining in the spirit and scope of the invention. Particularly, the housing material itself may be comprised of many different layers to provide additional sound muffling or custom color and fit, or of a single housing and muffling layer material. The sound muffling device may also be so constructed to accommodate coffee grinder devices that have side mounted on/off switches instead of top mounted on/off switches. Similarly, the sound muffling device may be so constructed to accommodate the wide varieties of shapes and sizes of coffee grinders currently on the market or envisioned to be on the market in the near future. While the placement of logos are shown for purposes of illustration, it will also be evident that additional logos and marketing designs can be applied to the sound muffling device in accordance with the requirements of the manufacturer and/or the end user.

INDUSTRIAL APPLICABILITY

Embodiments of the present invention allow for full functionality of an appliance such as a coffee grinder, while the appliance is completely enclosed within the soundproof housing. This offers several advantages, notably that it allows easy operation of the appliance in a simple manner, while reducing the sound of such operation. The sound reducing device is lightweight, easy to manufacture, and capable of being formed in a variety of shapes and designs, while still offering the utility for which it is intended. Custom covers can be used to suit surrounding environments, such as the overall kitchen design. The invention can also be used with other appliances and devices that can be operated by means of a push-button mechanism.

The foregoing description of embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. An apparatus for reducing the sound of a kitchen appliance, said apparatus comprising:

a housing having a substantially cylindrical shape, said housing including a curved sidewall defining an open bottom of said housing configured to receive the kitchen appliance, said curved sidewall further defining a closed peripheral top end of said housing, wherein said housing includes a sound reducing material;

a laminar insert stiffening element located within said peripheral top end, wherein said stiffening element is a laminar plastic insert; and, wherein pressure can be applied to said stiffening element to activate said kitchen appliance.

2. The apparatus of claim 1 wherein said sound reducing material is an acoustic foam.

3. The apparatus of claim 2 wherein said acoustic foam is bonded to said housing.

4. The apparatus of claim 1 wherein said housing is fabricated from a material that flexibly adapts to the contours of said kitchen appliance.

5. The apparatus of claim 1 wherein said kitchen appliance is a coffee grinder.

6. An apparatus for operating a coffee grinder while at the same time reducing the sound from said operating; comprising:

a housing having a substantially cylindrical shape, and fabricated from a material that flexibly adapts to the contours of said coffee grinder, said housing including a curved sidewall defining an open bottom of said housing for receiving said coffee grinder, said sidewall further defining a peripheral top end of said housing enclosure;

a sound reducing material within said housing;

a switch engaging mechanism including a laminar insert located within said peripheral top end, which when said coffee grinder is received within said housing, said switch engaging mechanism is in mechanical communication with an operation switch of said coffee grinder, wherein said laminar insert is made of a stiffened plastic.

7. The apparatus of claim 6 wherein said switch engaging mechanism can be used to operate said coffee grinder from outside of the housing.

8. The apparatus of claim 6 wherein said sound reducing material is an acoustic foam.

9. The apparatus of claim 8 wherein said acoustic foam is bonded to said housing.

10. The apparatus of claim 6 wherein said housing is fabricated from a material that flexibly adapts to the contours of said coffee grinder.

* * * * *